US012749968B2

(12) United States Patent
Zhang et al.

(10) Patent No.: US 12,749,968 B2
(45) Date of Patent: Sep. 29, 2026

(54) RESONANT CIRCUIT AND CONTROL METHOD THEREOF

(71) Applicant: Delta Electronics (Shanghai) Co., Ltd., Shanghai (CN)

(72) Inventors: Yingqi Zhang, Shanghai (CN); Shiyong Ni, Shanghai (CN); Yanling Zong, Shanghai (CN); Linchun Li, Shanghai (CN); Jinfa Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 204 days.

(21) Appl. No.: 18/402,758

(22) Filed: Jan. 3, 2024

(65) Prior Publication Data

US 2024/0243656 A1 Jul. 18, 2024

(30) Foreign Application Priority Data

Jan. 13, 2023 (CN) ......................... 202310072561.1

(51) Int. Cl.
*H02M 1/32* (2007.01)
*H02M 3/00* (2006.01)
*H02M 3/335* (2006.01)

(52) U.S. Cl.
CPC ............... *H02M 3/01* (2021.05); *H02M 1/32* (2013.01); *H02M 3/33507* (2013.01); *H02M 3/33573* (2021.05)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538;
(Continued)

(56) References Cited

U.S. PATENT DOCUMENTS 6,897,636 B2 * 5/2005 Harris ..................... H02J 1/102 323/272
2015/0103564 A1 * 4/2015 Duan ................ H02M 3/33571 363/21.02

FOREIGN PATENT DOCUMENTS

| | | | |
|---|---|---|---|
| CN | 107666249 | B | 12/2019 |
| EP | 3161950 | B1 | 4/2022 |
| JP | 5660729 | B2 | 1/2015 |

* cited by examiner

*Primary Examiner* — Crystal L Hammond
*Assistant Examiner* — Jonathan Walter Soileau
(74) *Attorney, Agent, or Firm* — CKC & Partners Co., LLC

(57) ABSTRACT

A resonant circuit and a control method thereof, the resonant circuit including a plurality of resonant modules connected in parallel. The control method includes: obtaining an output current signal and an output voltage signal according to an output current and an output voltage sampled of the respective resonant module; correspondingly generating, via the respective resonant module, a first control voltage signal through a voltage loop according to a current difference between the output current and an average output current and the output voltage signal, and correspondingly generating a second control voltage signal through a current loop according to the output current signal; selecting to use one of the first or second control voltage signal according to whether the output current reaches the current limit value for controlling a switch frequency of the corresponding resonant module, thereby achieving current-sharing or current-limiting control of the respective resonant module.

10 Claims, 5 Drawing Sheets

(58) Field of Classification Search
CPC ......... H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491
See application file for complete search history.

RESONANT CIRCUIT AND CONTROL METHOD THEREOF

CROSS-REFERENCE TO RELATED APPLICATIONS

This non-provisional application claims priority under 35 U.S.C. § 119(a) on patent application Ser. No. 202310072561.1 filed in P.R. China on Jan. 13, 2023, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

BACKGROUND OF THE APPLICATION

1. Field of the Application

The application relates to the field of power electronics, and particularly to a resonant circuit and a control method thereof.

2. Related Art

Due to advantages such as high efficiency and a small volume, resonant DC/DC converters are widely applied to various industrial power supplies. In order to improve output currents of the resonant DC/DC converters, it is a common method to run multiple DC/DC resonant modules in parallel, and the advantage of parallel running is to rapidly achieve different output currents to satisfy different applications.

When the multiple DC/DC resonant modules run in parallel, due to a difference of circuit parameters and a difference of output voltage references, an output voltage of each DC/DC resonant module has a difference, and if not adopting output current-sharing measures, an output current of each DC/DC resonant module has a large difference, causing overcurrent and over-temperature damage to the elements. Taking parallel connection of the DC/DC resonant modules of a LLC structure including a resonant inductor $L_r$ and a resonant capacitor $C_r$ for example, as shown in FIG. 1, a sampling resistor R is connected in series to an output end of each DC/DC resonant module for sampling an output current of the DC/DC resonant module, and these sampled current signals generate an average output current signal of each DC/DC resonant module through an average circuit. A difference (such as, KΔI1, KΔI2) between an output current signal (such as, Current_I1, Current_I2) of the respective DC/DC resonant module and an average output current signal (such as, Current_share) regulates a reference voltage value (such as, Vref1, Vref2) of the respective DC/DC resonant module, and a difference between an output voltage sampling value (such as, Vo1, Vo2) and the reference voltage value (such as, Vref1, Vref2) controls a switch frequency of the DC/DC resonant modules (such as, controlling a switch frequency of the switch elements $Q_1$ to $Q_4$) after regulation of an operational amplifier, thereby achieving current sharing. For example, assuming that the output current signal (such as, Current_I1) of the first DC/DC resonant module (such as, the DC/DC resonant module above in FIG. 1) is larger than the average output current signal (such as, Current_share), the current difference signal (such as, KΔI1) is a negative value, such that the reference voltage value (such as, Vref1) of the first DC/DC resonant module decreases, and the output current decreases, thereby achieving current-sharing effect.

However, the parallel current-sharing circuit shown in FIG. 1 has the following disadvantages: when an output of the DC/DC resonant module is switched to a large capacitive load, the load current has a large transient current component, an operational amplifier for sampling the current is easily saturated, and after the transient current of the load disappears, a difference of desaturation characteristics of each operational amplifier allows the current-sharing circuit to generate an error signal, thereby changing the reference voltage value of the respective DC/DC resonant module, and causing additional dynamic regulation.

SUMMARY OF THE APPLICATION

An object of the application is to provide a resonant circuit and a control method thereof, which can effectively solve one or more deficiencies in the prior art.

To achieve the object, the application provides a control method of a resonant circuit, the resonant circuit including a plurality of resonant modules connected in parallel, each resonant module including a rectifier bridge, the control method including: obtaining an output current signal and an output voltage signal of the respective resonant module according to an output current and an output voltage of the rectifier bridge of the respective resonant module sampled; correspondingly generating, via the respective resonant module, a first control voltage signal through a voltage loop according to a current difference between the output current and an average output current of all resonant modules and the output voltage signal of the respective resonant module, and correspondingly generating a second control voltage signal through a current loop according to the output current signal, wherein when the output current does not reach a current limit value, the voltage loop works, and the resonant module is in current-sharing operation; when the output current reaches the current limit value, the current loop works, and the resonant module is in current-limiting operation; selecting to use one of the first control voltage signal or the second control voltage signal according to whether the output current reaches the current limit value for controlling a switch frequency of the corresponding resonant module, thereby achieving current-sharing or current-limiting control of the respective resonant module.

In some embodiments of the application, the respective resonant module regulates a reference voltage value of the voltage loop of the corresponding resonant module according to the output current of the rectifier bridge, thereby achieving current-sharing running of the respective resonant module.

In some embodiments of the application, generating the first control voltage signal includes: obtaining an average current signal of all resonant modules according to the output current signal of the respective resonant module; generating a corresponding first current difference signal according to the corresponding output current signal and the average current signal of the module; regulating the reference voltage value of the corresponding resonant module to generate a corresponding regulated reference voltage value according to the corresponding first current difference signal; generating a corresponding voltage difference signal according to the output voltage signal and the regulated reference voltage value; and generating the corresponding first control voltage signal by regulating the voltage difference signal.

In some embodiments of the application, the respective resonant module generates the corresponding second control voltage signal according to the output current signal and the corresponding current limit, and the process of generating the second control voltage signal includes: calculating a difference between the output current signal and the corresponding current limit to generate a corresponding second current difference signal; and regulating the second current difference signal to generate the corresponding second control voltage signal.

In some embodiments of the application, the method of obtaining the output current signal according to the output current is: directly using the output current as the output current signal, or performing low-pass filtering and/or amplification processing on the output current to obtain the output current signal.

In some embodiments of the application, the output current signal is an output current of the rectifier bridge, or obtained by rectification of a primary resonant current of the resonant module.

To achieve the object, the application further provides a resonant circuit, including a plurality of resonant modules connected in parallel, each resonant module including a rectifier bridge, and further including: a sampling unit for sampling an output current and an output voltage of the rectifier bridge of the respective resonant module to obtain an output current signal and an output voltage signal of the respective resonant module; a voltage loop for correspondingly generating a first control voltage signal according to a current difference between the output current of the respective resonant module and an average output current of all resonant modules and the output voltage signal of the respective resonant module, wherein when the output current does not reach a current limit value, the voltage loop works, and the resonant module is in current-sharing operation; a current loop for correspondingly generating a second control voltage signal according to the output current signal of the corresponding resonant module, wherein when the output current reaches the current limit value, the current loop works, and the resonant module is in current-limiting operation; and a selection unit for selecting to use one of the first control voltage signal or the second control voltage signal according to whether the output current reaches the current limit value for controlling a switch frequency of the corresponding resonant module, thereby achieving current-sharing or current-limiting control of the respective resonant module.

In some embodiments of the application, the voltage loop includes: an average value calculating unit for obtaining an average current signal of all resonant modules according to the output current signal of the respective resonant module; a first calculating unit for generating a corresponding first current difference signal according to the corresponding output current signal and the average current signal; a voltage reference regulating unit for regulating the reference voltage value of the corresponding resonant module to generate a corresponding regulated reference voltage value according to the corresponding first current difference signal; a voltage comparing unit for generating a corresponding voltage difference signal according to the output voltage signal and the regulated reference voltage value; and a voltage regulating unit for regulating the voltage difference signal to generate the corresponding first control voltage signal.

In some embodiments of the application, the current loop includes: a second calculating unit for calculating a difference between the output current signal and a current limit of the corresponding resonant module to generate a corresponding second current difference signal; and a current regulating unit for regulating the second current difference signal to generate the corresponding second control voltage signal.

In some embodiments of the application, the respective resonant module generates the output current signal and the output voltage signal through an analog circuit or a digital circuit.

The application provides a method of controlling parallel current-sharing based on a difference of output currents of the rectifier bridges of the resonant modules, which achieves active current-sharing of the multiple resonant modules, and each resonant module is characterized by current limiting of the current loop, such that the resonant module has good dynamic characteristic, may effectively limit a current stress of the switching devices when the output of the resonant module has a large transient current or a short circuit, and effectively improve reliability of the circuit.

BRIEF DESCRIPTION OF THE DRAWINGS

Exemplary embodiments are described in details with reference to the accompanying drawings, and the above and other features and advantages of the application become more apparent.

DETAILED EMBODIMENTS OF THE APPLICATION

Figure 1:
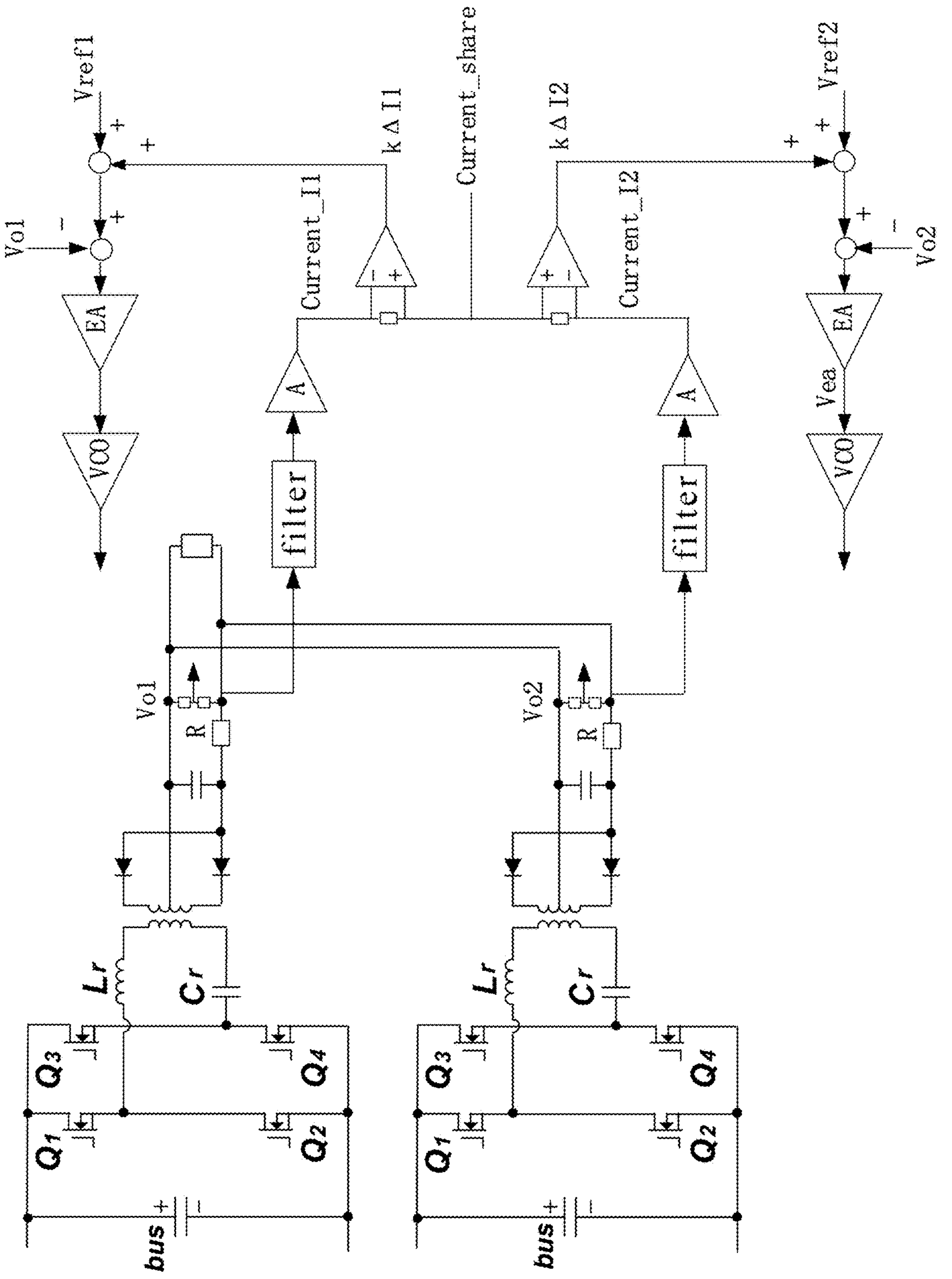
FIG. 1 is a schematic diagram of a circuit of controlling parallel current-sharing based on a difference of output currents of resonant modules in the prior art.

Now the exemplary embodiments are comprehensively described with reference to the accompanying drawings. However, the exemplary embodiments can be implemented in various forms, and shall not be understood to be limited to the embodiments set forth herein; on the contrary, these embodiments are provided so that this disclosure will be thorough and complete, and the conception of exemplary implementations will be fully conveyed to those skilled in the art. In the drawings, the same reference numerals denote the same or similar structure, thus their detailed description will be omitted.

When introducing the described and/or illustrated elements or components or the like, the words "one", "a", "the" and "at least one" represent one or more elements or components, or the like. The terms "comprise", "include" and "have" represent an open and including meaning, and refer to another elements or components, or the like, in addition to the listed elements or components, or the like. Moreover, when two components are "connected" or "coupled", both may be directly connected or coupled, and also may have an intervening component. The embodiments may use relative words, such as, "above" or "under" to describe a relative relation of one component relative to another component. It can be understood that if the labeled device is inverted up side down, the "above" component becomes an "under"component. In addition, the terms "first", "second" and the like in the claims are only used as signs, not limiting to the number of the object.

Figure 2:
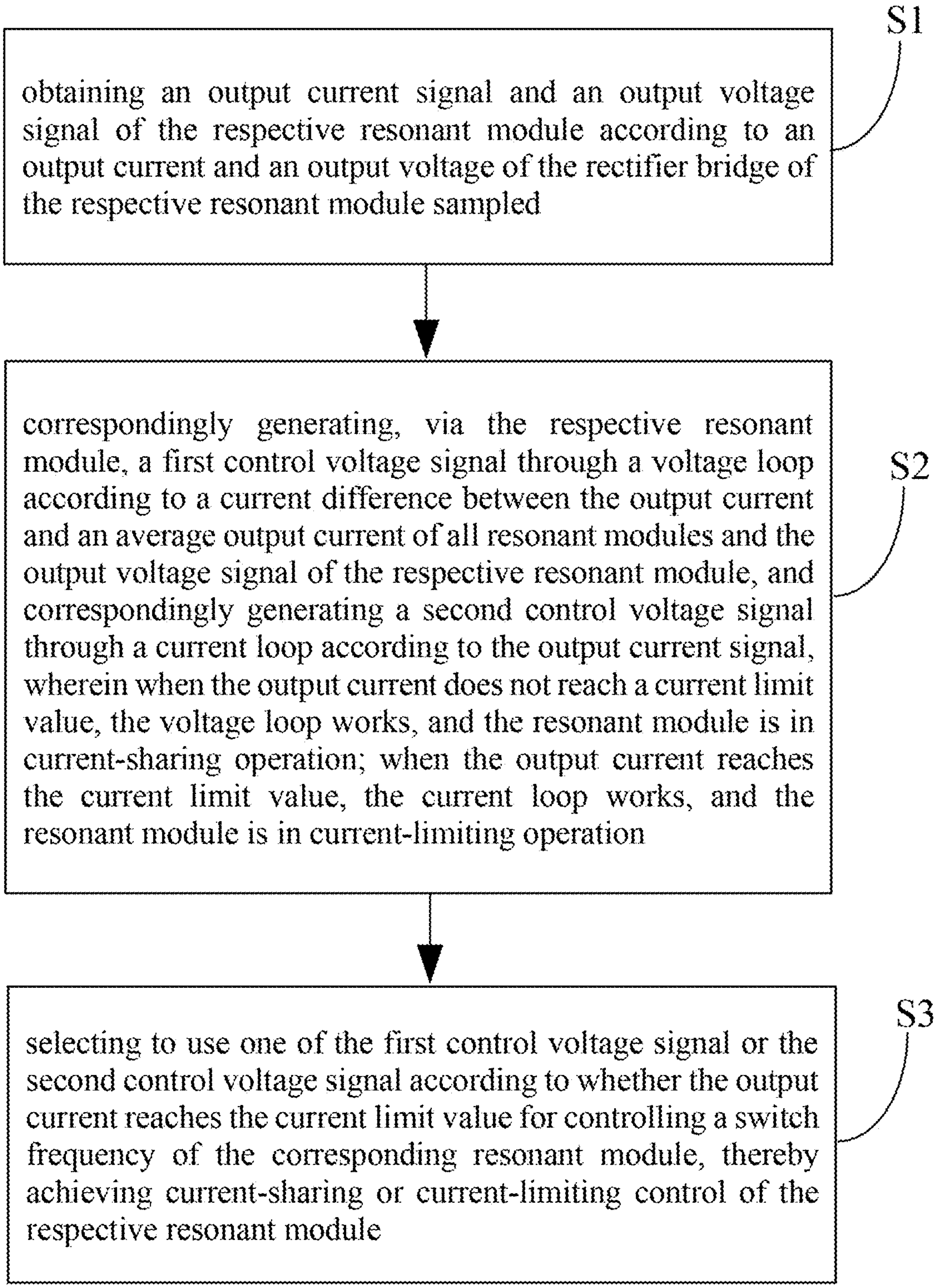
FIG. 2 is a flow diagram of a control method of a resonant circuit according to the application.

As shown in FIG. 2, the application provides a control method of a resonant circuit, the resonant circuit including a plurality of resonant modules connected in parallel, each resonant module including a rectifier bridge. The control method mainly includes steps of:

S1, obtaining an output current signal and an output voltage signal of the respective resonant module according to an output current and an output voltage of the rectifier bridge of the respective resonant module sampled;

S2, correspondingly generating, via the respective resonant module, a first control voltage signal through a voltage loop according to a current difference between the output current and an average output current of all resonant modules and the output voltage signal of the respective resonant module, and correspondingly generating a second control voltage signal through a current loop according to the output current signal, wherein when the output current does not reach a current limit value, the voltage loop works, and the resonant module is in current-sharing operation; when the output current reaches the current limit value, the current loop works, and the resonant module is in current-limiting operation; and S3, selecting to use one of the first control voltage signal or the second control voltage signal according to whether the output current reaches the current limit value for controlling a switch frequency of the corresponding resonant module, thereby achieving current-sharing or current-limiting control of the respective resonant module.

In some embodiments of the application, the respective resonant module regulates a reference voltage value of the voltage loop of the corresponding resonant module according to a difference of the output current of the rectifier bridge, thereby achieving current-sharing running of the respective resonant module. The process of generating the corresponding first control voltage signal, for example, may include: obtaining an average current signal of all resonant modules according to the output current signal of the respective resonant module; generating a corresponding first current difference signal according to the corresponding output current signal and the average current signal; regulating the reference voltage value of the corresponding resonant module to generate a corresponding regulated reference voltage value according to the corresponding first current difference signal; generating a corresponding voltage difference signal according to the output voltage signal and the regulated reference voltage value; and generating the corresponding first control voltage signal by regulating the voltage difference signal.

In some embodiments of the application, the respective resonant module further has a current limit, and the respective resonant module generates the corresponding second control voltage signal according to the output current signal and the corresponding current limit. The process of generating the second control voltage signal includes: calculating a difference between the output current signal and the corresponding current limit to generate a corresponding second current difference signal; and regulating the second current difference signal to generate the corresponding second control voltage signal.

In some embodiments of the application, the respective resonant module generates the output current signal and the output voltage signal through an analog circuit or a digital circuit.

In some embodiments of the application, the method of obtaining the output current signal according to the output current, for example, may be: directly using the output current as the output current signal, or performing low-pass filtering and/or amplification processing on the output current to obtain the output current signal.

In some embodiments of the application, the output current signal can be obtained according to the output current of the rectifier bridge sampled, and can also be obtained by rectification of a primary resonant current of the resonant module sampled.

In some embodiments of the application, a primary circuit of each resonant module is a full-bridge circuit or a half-bridge circuit.

Figure 3A:
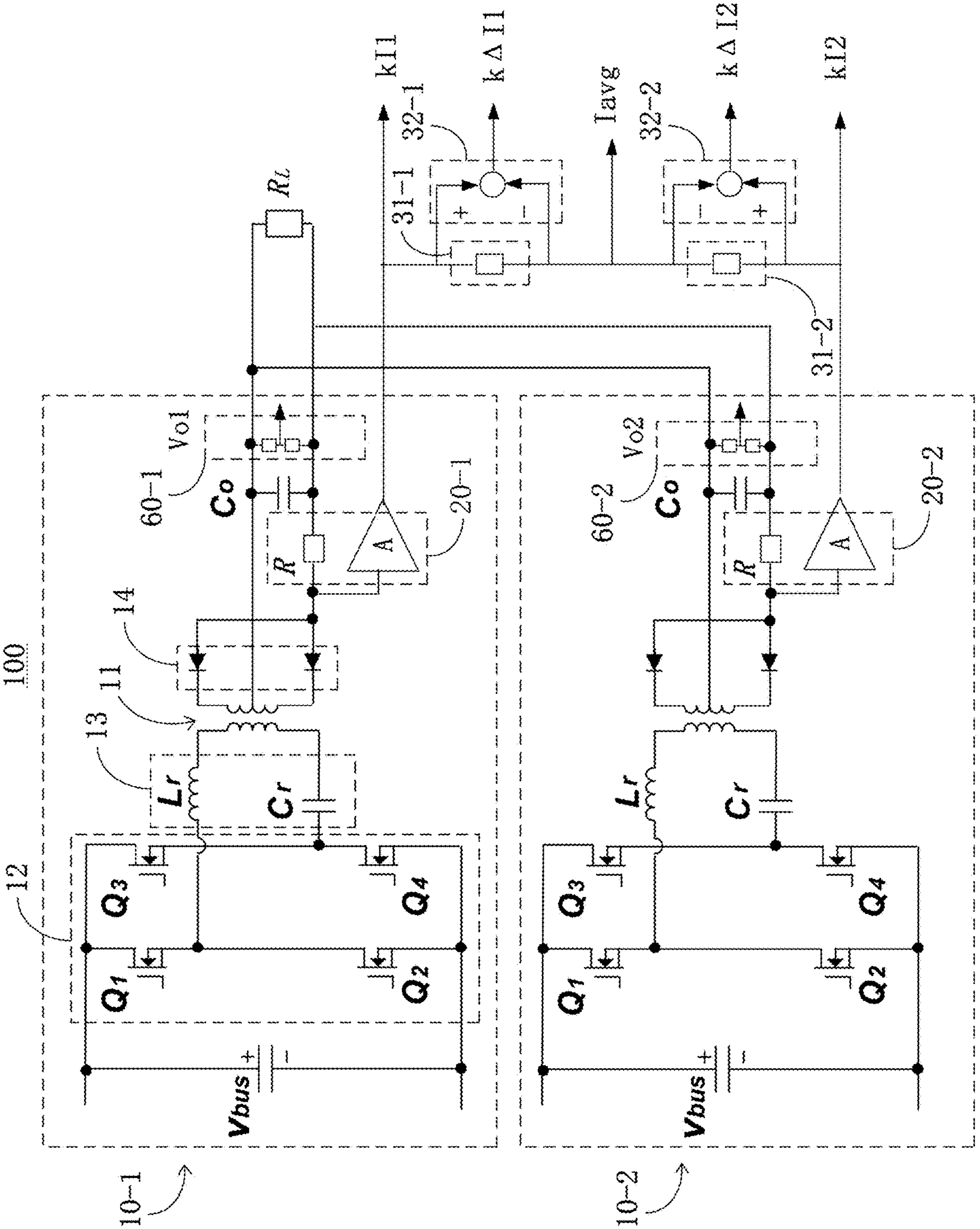
FIG. 3A is a schematic diagram of parallel current-sharing control of a resonant circuit provided in the application, wherein taking implementation of an analog circuit for example, it shows a method of controlling parallel current-sharing based on a difference of output currents of rectifier bridges of resonant modules.
Figure 3B:
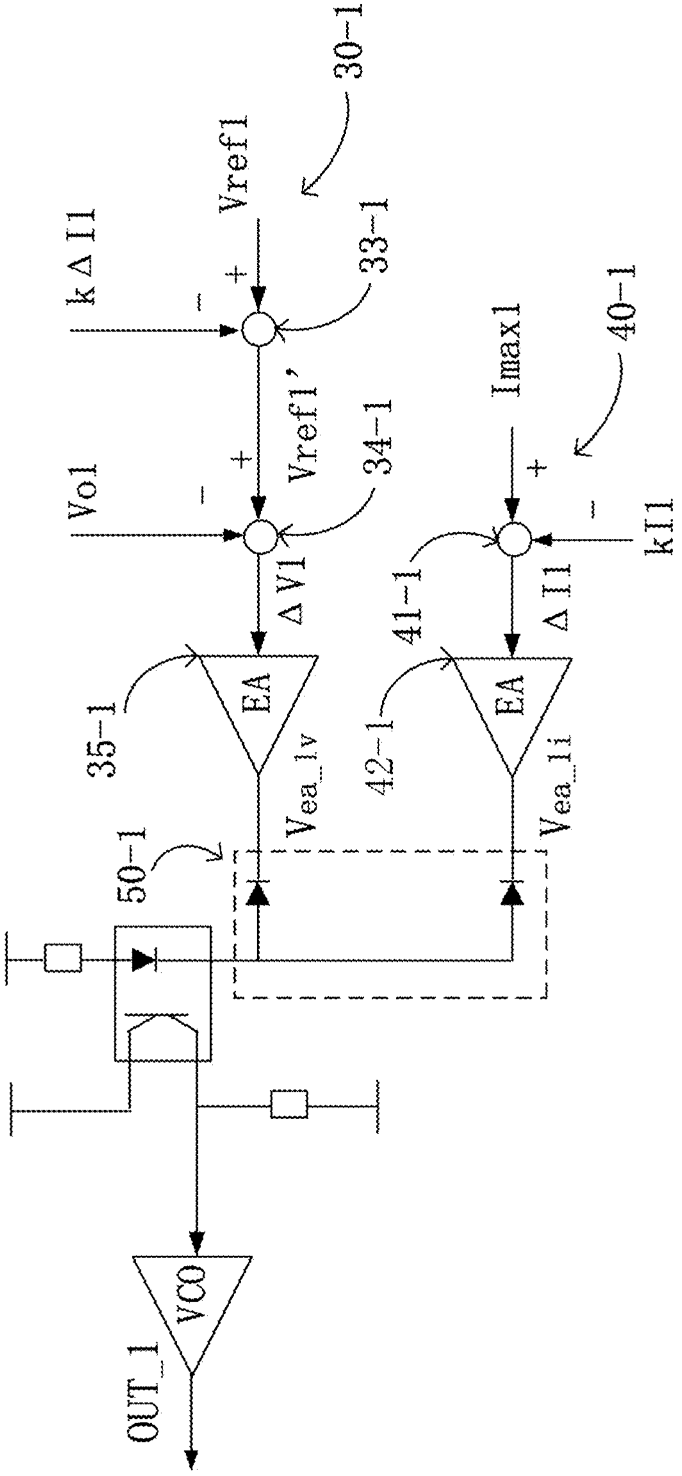
FIGS. 3B and 3C illustrate schematic diagrams of circuits of a control portion connected to the circuit shown in FIG. 3A and configured for current-sharing or current-limiting control of the resonant modules 10-1 and 10-2 in FIG. 3A.
Figure 3C:
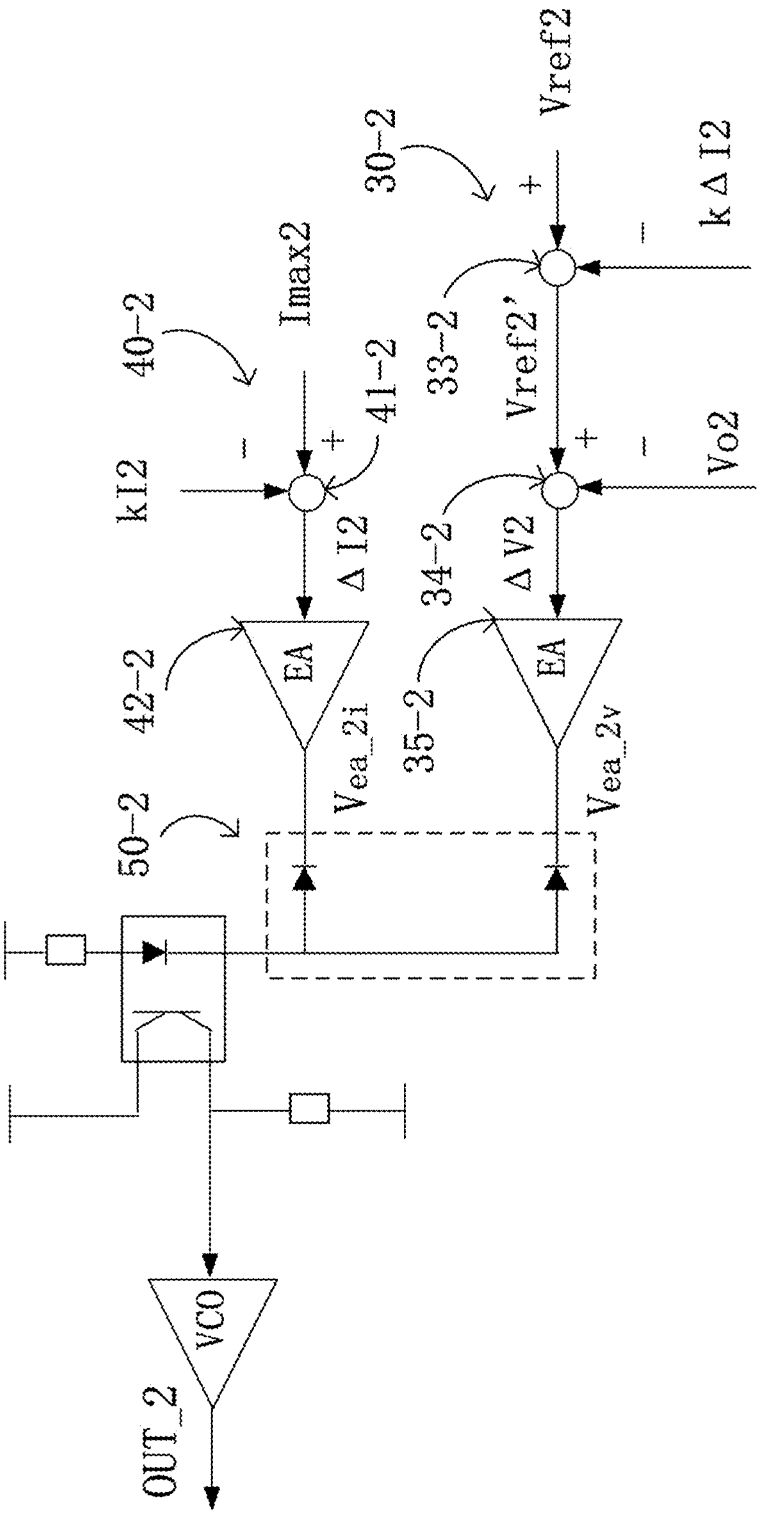

As shown in FIGS. 3A to 3C, the application provides a resonant circuit 100 including a plurality of resonant modules connected in parallel, and taking the embodiment in FIG. 3A for example, it illustrates two resonant modules 10-1 and 10-2 connected in parallel. For example, outputs of the resonant modules 10-1 and 10-2 are connected in parallel together for powering a load $R_L$. However, it can be understood that in other embodiments, it may also be more resonant modules connected in parallel, but the application is not limited thereto. In the application, each resonant module includes a rectifier bridge 14 (for purpose of simplicity, FIG. 3A marks it only in the resonant module 10-1). Each resonant module (such as, 10-1, 10-2) further includes a current sampling unit (such as, 20-1, 20-2), a voltage sampling unit (such as, 60-1, 60-2), a voltage loop (such as, 30-1, 30-2), a current loop (such as, 40-1, 40-2) and a selection unit (in an analog circuit, it may be realized by two diodes, such as, 50-1 in FIG. 3B and 50-2 in FIG. 3C; in digital control, it may be selected by directly comparing the magnitude of two signals).

The current sampling unit (such as, 20-1 and 20-2 consisting of a sampling resistor R and an operational amplifier A) is configured for sampling an output current of the rectifier bridge of the respective resonant module (such as, 10-1, 10-2) to obtain an output current signal (such as, KI1, KI2). The voltage sampling unit (such as, 60-1, 60-2) is configured for sampling an output voltage to obtain an output voltage signal (such as, Vo1, Vo2). In the embodiment of FIG. 3A, sampling is performed taking the analog circuit for example, but it can be understood that in the application, the respective resonant module may be used the analog circuit or a digital circuit as the sampling unit to generate the output current signal and the output voltage signal, but the application is not limited thereto. Preferably, the sampling unit (such as, 20-1, 20-2) may directly use the output current as the output current signal, or perform low-pass filtering and/or amplification processing on the output current to obtain the output current signal through a low-pass filter and/or an amplifier. In some other embodiments, the output current signal (such as, KI1, KI2) may not be obtained according to the output current of the rectifier bridge sampled in FIG. 3A, but obtained by rectification of a primary resonant current of the resonant module sampled.

When the output current does not reach a current limit value (i.e., the output current is normal), the voltage loop (such as, 30-1, 30-2) works, and the resonant module (such as, 10-1, 10-2) is in current-sharing operation. The voltage loop (such as, 30-1, 30-2) is configured for correspondingly generating a first control voltage signal (such as, Vea_1$v$, Vea_2$v$) according to a current difference between the output current of the corresponding resonant module (such as, 10-1, 10-2) and an average output current of all resonant modules and the output voltage signal (such as, Vo1, Vo2) of the corresponding resonant module (such as, 10-1, 10-2).

When the output current reaches the current limit value (i.e., the output current is abnormal), the current loop (such as, 40-1, 40-2) works, and the resonant module (such as, 10-1, 10-2) is in current-limiting operation, i.e., the output current of the resonant module is limited to a set current value. The current loop (such as, 40-1, 40-2) is configured for correspondingly generating a second control voltage signal (such as, Vea_1$i$, Vea_2$i$) according to the output current signal (such as, KI1, KI2) of the corresponding resonant module (such as, 10-1, 10-2).

The selection unit is configured for selecting to use one of the first control voltage signal (such as, Vea_1$v$, Vea_2$v$) or the second control voltage signal (such as, Vea_1$i$, Vea_2$i$) according to whether the output current reaches the current limit value for controlling a switch frequency of the corresponding resonant module (such as, 10-1, 10-2), thereby achieving current-sharing or current-limiting control of the respective resonant module. For example, in FIG. 3B, the selected first control voltage signal (such as, Vea_1$v$) or second control voltage signal (such as, Vea_1$i$) may control the switch frequency of the corresponding resonant module 10-1, i.e., generating a corresponding output signal OUT_1; in FIG. 3C, the selected first control voltage signal (such as, Vea_2$v$) or second control voltage signal (such as, Vea_2$i$) may control the switch frequency of the corresponding resonant module 10-2, i.e., generating a corresponding output signal OUT_2.

In some embodiments of the application, the respective resonant module (such as, 10-1, 10-2) may generate the corresponding first control voltage signal (such as, Vea_1$v$, Vea_2$v$) through the voltage loop (such as, 30-1, 30-2) according to the corresponding reference voltage value (such as, Vref1, Vref2) and the output voltage signal (such as, Vo1, Vo2) of the corresponding resonant module.

The voltage loop (such as, 30-1, 30-2), for example, may include an average value calculating unit (such as, 31-1, 31-2) for obtaining an average current signal (such as, Iavg) of all resonant modules according to the output current signal (such as, KI1, KI2) of the respective resonant module (such as, 10-1, 10-2), a first calculating unit (such as, 32-1, 32-2) for generating a corresponding current error signal (such as, KΔI1, KΔI2) according to the corresponding output current signal (such as, KI1, KI2) and the average current signal (such as, Iavg), a voltage reference regulating unit (such as, 33-1, 33-2) for regulating the reference voltage value (such as, Vref1, Vref2) of the corresponding resonant module to generate a corresponding regulated reference voltage value (such as, Vref1', Vref2') according to the corresponding current error signal (such as, KΔI1, KΔI2), a voltage comparing unit (such as, 34-1, 34-2) for generating a corresponding voltage difference signal (such as, ΔV1, ΔV2) according to the output voltage signal (such as, Vo1, Vo2) and the regulated reference voltage value (such as, Vref1', Vref2'), and a voltage regulating unit (such as, 35-1, 35-2), which for example, may be an operational amplifier, for regulating the voltage difference signal (such as, ΔV1, ΔV2) to generate the corresponding first control voltage signal (such as, Vea_1$v$, Vea_2$v$).

In some embodiments of the application, the respective resonant module (such as, 10-1, 10-2) further has a current limit (such as, Imax1, Imax2), and the respective resonant module generates the corresponding second control voltage signal (such as, Vea_1$i$, Vea_2$i$) through the current loop (such as, 40-1, 40-2) according to the output current signal (such as, KI1, KI2) and the corresponding current limit (such as, Imax1, Imax2).

In some embodiments of the application, the current loop (such as, 40-1, 40-2), for example, may include a second calculating unit (such as, 41-1, 41-2) for calculating a difference between the output current signal (such as, KI1, KI2) and the corresponding current limit (such as, Imax1, Imax2) to generate a corresponding second difference signal (such as, ΔI1, ΔI2), and a current regulating unit (such as, 42-1, 42-2) for regulating the second current difference signal (such as, ΔI1, ΔI2) to generate the corresponding second control voltage signal (such as, Vea_1$i$, Vea_2$i$).

In the application, taking the resonant module 10-1 in FIG. 3A for example, each resonant module, for example, may be a DC/DC module, which may include a transformer 11, a primary circuit 12 and a resonant cavity 13 on a primary side of the transformer 11, and a rectifier bridge 14 on a secondary side of the transformer 11. The primary circuit 12 maybe a full-bridge circuit or a half-bridge circuit, for example, the primary circuit 12 in FIG. 3A shows a full-bridge circuit consisting of switch elements Q1 to Q4. In the embodiment of FIG. 3A, the resonant cavity 13, for example, may be a LLC resonant cavity, including a resonant inductor $L_r$ and a resonant capacitor $C_r$. In the embodiment of FIG. 3A, the secondary side may further include a capacitor $C_o$. Of course, it can be understood that the resonant circuit of the application is not limited to the circuit as disclosed, and the application is not limited thereto.

The method of current-sharing control of the resonant circuit provided in the application is mainly to: regulate a reference voltage value of the output voltage of the respective resonant module according to a difference between the output current outputted from the rectifier bridge of the respective resonant module and the average current outputted from the rectifier bridges of all resonant modules; generate a control voltage signal through regulation of the voltage loop after an output voltage sampling signal of the respective resonant module is compared with the respective reference voltage; while generating another control voltage signal through regulation of the current loop according to a difference between an output current sampling signal outputted from the rectifier bridge of the respective resonant module and the allowed current limit of the resonant module; wherein the output signals control a switch frequency of the resonant module after the two control voltage signals generated by the voltage loop and the current loop pass through one selection circuit. When the output current does not reach a current limit value (i.e., the output current is normal), the voltage loop may work, such that each resonant module is in current-sharing operation. However, when the output current reaches the current limit value (i.e., the output current is abnormal), for example, including but not limited to that the output of the resonant module is switched to a large capacitive load (such as, generating a relative large transient current) or has a short circuit, the current loop may work, such that each resonant module is in current-limiting operation.

Hereinafter taking sampling of the analog circuit shown in FIGS. 3A to 3C for example, the method of current-sharing control and current-limiting control of the resonant module in the application is described in details. After a high-frequency rectified output current of the respective resonant module goes through sampling, low-pass filtering and amplification, the output current signals KI1 and KI2 of the rectifier bridge of the respective resonant module are obtained, and the respective output current signals are connected to one average value calculating unit (such as, 31-1, 31-2) to obtain an average current signal Iavg of the output currents of the rectifier bridges of all resonant modules. The average current signal is subtracted from the output current signal of the respective resonant module to obtain the current error signals KΔI1 and KΔI2 of each resonant module, and these current error signals KΔI1 and KΔI2 are configured for regulating the reference voltage values Vref1 and Vref2 of the respective resonant module. The output voltage sampling value (i.e., the output voltage signals Vo1 and Vo2) of the respective resonant module is compared with the respective reference voltage values Vref1 and Vref2 to generate a voltage difference (i.e., the voltage difference signals ΔV1 and ΔV2), and output the first control voltage signal Vea_1*v* and Vea_2*v* after regulation of the operational amplifier. The output current signals KI1 and KI2 of the rectifier bridge are compared with the current limits Imax1 and Imax2 of the resonant module to output the second control voltage signal Vea_1*i* and Vea_2*i* after regulation of the operational amplifier. In each resonant module, outputs of the two operational amplifiers (such as, 35-1 and 42-1 in the resonant module 10-1, or 35-2 and 42-2 in the resonant module 10-2) are configured for changing output of an optocoupler via one selection unit (such as, realized by two diodes), and the output of the optocoupler changes a switch frequency of the resonant module through one voltage to frequency converter (such as, a voltage-controlled oscillator VCO). When the output current reaches the current limit value (i.e., the output current is abnormal), the current loop (such as, 40-1, 40-2) functions, and the second control voltage signals Vea_1*i* and Vea_2*i* are used to control the switch frequency of the resonant module, such that each resonant module is in current-limiting operation. However, when the output current does not reach the current limit value (i.e., the output current is normal), the voltage loop (such as, 30-1, 30-2) functions, and the first control voltage signal Vea_1*v* and Vea_2*v* are used to control the switch frequency of the resonant module, such that each resonant module is in current-sharing operation.

The resonant circuit and the control method thereof provided in the application may achieve active current-sharing of the multiple resonant modules, such that each resonant module is characterized by current limiting, and the sampled current signal is the output current of the rectifier bridge of the resonant module. In such way, the resonant module may achieve the function of current limiting at a transient state, and when the output of the resonant module is switched to a large capacitive load, or has a short circuit, the output current of the rectifier bridge is limited, and response of the resonant module is stable. The resonant modules with current limiting of the current loop also effectively limit a transient current of MOSFETs or diodes, thereby improving reliability of the switch elements.

The resonant circuit and the control method thereof provided in the application may allow the resonant modules to have good dynamic characteristic, and effectively limit a current stress of the switching devices when the output of the resonant module has a large transient current or a short circuit, thereby effectively improving reliability of the circuit.

Exemplary embodiments of the application have been shown and described above. It should be understood that the application is not limited to the disclosed embodiments. Instead, the application intends to cover various modifications and equivalent settings included in the spirit and scope of the appended claims.

What is claimed is:

1. A control method of a parallel resonant circuit, the parallel resonant circuit comprising N(N≥2) resonant circuits connected in parallel, each of the N resonant circuits comprising power switches and a rectifier bridge, the control method comprising:

sampling output currents and output voltages of rectifier bridges of the N resonant circuits through a sampling unit to obtain corresponding N output current signals and N output voltage signals;

calculating an average output current from the N output current signals through an average value calculating unit;

obtaining a first current difference by comparing an output current of a corresponding resonant circuit with the average output current through a voltage loop controller; correcting a reference voltage value based on the first current difference to generate a final reference voltage value; generating an output voltage difference by comparing the final reference voltage value with an output voltage of the corresponding resonant circuit; and generating a first control voltage signal based on the output voltage difference;

obtaining a second current difference by comparing a first current threshold with the output current of the corresponding resonant circuit through a current loop controller, and then generating a second control voltage signal based on the second current difference;

selectively outputting the first control voltage signal or the second control voltage signal to the corresponding resonant circuit through a selection unit, and adjusting a switching frequency of the power switches in the corresponding resonant circuit based on the first control voltage signal or the second control voltage signal, thereby achieving current-sharing or current-limiting control of the corresponding resonant circuit, wherein:

when the output current of the corresponding resonant circuit is less than the first current threshold, the first control voltage signal is selectively output to the corresponding resonant circuit to control the corresponding resonant circuit to operate in a current-sharing mode; and when the output current of the corresponding resonant circuit is greater than or equal to the first current threshold, the second control voltage signal is selectively output to the corresponding resonant circuit to control the corresponding resonant circuit to operate in a current-limiting mode.

2. The control method of a parallel resonant circuit according to claim 1, wherein the sampling unit samples a current on an output line between an output of the rectifier bridge and an output capacitor of the corresponding resonant circuit.

3. The control method of a parallel resonant circuit according to claim 2, wherein the sampling unit comprises a current sampling unit, and the current sampling unit is connected between the output of the rectifier bridge and the output capacitor of the corresponding resonant circuit.

4. The control method of a parallel resonant circuit according to claim 3, further comprising:

obtaining an output current signal of the corresponding resonant circuit by processing the output current of the corresponding resonant circuit via high-pass filtering and/or amplification using the current sampling unit.

5. The control method of a parallel resonant circuit according to claim 1, wherein the first control voltage signal is generated by amplifying the output voltage difference, and wherein the second control voltage signal is generated by amplifying the second current difference.

6. A parallel resonant circuit, comprising N(N≥2) resonant circuits connected in parallel, each of the N resonant circuits comprising power switches and a rectifier bridge, and each of the N resonant circuits further comprising:

a sampling unit, configured to sample an output currents and an output voltage of the rectifier bridges of a corresponding resonant circuit to obtain an output current signal and an output voltage signals;

an average value calculating unit, configured to calculate an average output current based on N output current signals;

a voltage loop controller, configured to adjust an output voltage of the corresponding resonant circuit based on a reference voltage value; generate a first current difference by comparing an output current of the corresponding resonant circuit with the average output current; correct the reference voltage value based on the first current difference to generate a final reference voltage value; generate an output voltage difference by comparing the final reference voltage value and the output voltage of the corresponding resonant circuit; and generate a first control voltage signal based on the output voltage difference;

a current loop controller, configured to generate a second current difference by comparing a first current threshold and the output current of the corresponding resonant circuit; and generate a second control voltage signal based on the second current difference;

a selection unit, configured to receive the first control voltage signal and the second control voltage signal; selectively output the first control voltage signal or the second control voltage signal to the corresponding resonant circuit based on a comparison between the first current threshold and the output current of the corresponding resonant circuit; adjust a switching frequency of the corresponding resonant circuit based on the first control voltage signal or the second control voltage signal, thereby achieving current-sharing or current-limiting control of the corresponding resonant circuit;

wherein when the output current of the corresponding resonant circuit is less than the first current threshold, the selection unit selectively outputs the first control voltage signal to control the corresponding resonant circuit to operate in a current-sharing mode; and when the output current of the corresponding resonant circuit is greater than or equal to the first current threshold, the selection unit selectively outputs the second control voltage signal to control the corresponding resonant circuit to operate in a current-limiting mode.

7. The parallel resonant circuit according to claim 6, wherein the sampling unit comprises:

a current sampling unit connected between an output of the rectifier bridge and an output capacitor of the corresponding resonant circuit.

8. The parallel resonant circuit according to claim 7, wherein the current sampling unit comprises:

a filter and/or an amplifier, configured to process the output current of the corresponding resonant circuit through filtering and/or amplification to obtain an output current signal of the corresponding resonant circuit.

9. The parallel resonant circuit according to claim 7, wherein the current sampling unit comprises:

at least one of a sampling resistor, a CT sampler, or a Hall current sensor.

10. The parallel resonant circuit according to claim 7, wherein an output current signal and an output voltage signal of each of the N resonant circuits are generated by an analog circuit or a digital circuit.

* * * * *